United States Patent
King et al.

(10) Patent No.: US 8,346,287 B2
(45) Date of Patent: Jan. 1, 2013

(54) PROVISIONING MOBILE TERMINALS WITH A TRUSTED KEY FOR GENERIC BOOTSTRAP ARCHITECTURE

(75) Inventors: William Chung King, LaFayette, CA (US); Bjorn Hjelm, Livermore, CA (US); Thomas W. Haynes, San Ramon, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 13/076,913

(22) Filed: Mar. 31, 2011

(65) Prior Publication Data
US 2012/0252531 A1 Oct. 4, 2012

(51) Int. Cl.
*H04W 68/00* (2009.01)
(52) U.S. Cl. ........ 455/458; 380/249; 380/270; 455/433; 455/411
(58) Field of Classification Search .............. 455/428, 455/417, 509, 426.1, 427, 411; 380/249; 370/321, 337, 347, 522
See application file for complete search history.

(56) References Cited

U.S. PATENT DOCUMENTS

| | | | |
|---|---|---|---|
| 7,308,431 B2* | 12/2007 | Asokan et al. | 705/67 |
| 2006/0085848 A1* | 4/2006 | Aissi et al. | 726/9 |
| 2006/0218396 A1* | 9/2006 | Laitinen et al. | 713/167 |
| 2006/0230436 A1* | 10/2006 | Holtmanns et al. | 726/4 |
| 2007/0042754 A1* | 2/2007 | Bajikar et al. | 455/411 |
| 2009/0209232 A1* | 8/2009 | Cha et al. | 455/411 |
| 2011/0151836 A1* | 6/2011 | Dadu et al. | 455/411 |

\* cited by examiner

*Primary Examiner* — Meless N Zewdu
*Assistant Examiner* — Mahendra Patel (57) ABSTRACT

Mobile terminals may be authenticated separately from a smart card used by the mobile terminal. In one implementation, a mobile terminal may query a remote server, based on a value identifying the mobile terminal, for security information relating to the mobile terminal, where a copy of the security information is stored in the mobile terminal as part of the manufacture of the mobile terminal. A smart card may receive the security information in response to the query. The security information may be received in an encrypted format that is not accessible by the mobile terminal. The smart card may communicate with the mobile terminal to authenticate the mobile terminal based on the security information received in response to the query and the copy of the security information that is stored in the mobile terminal.

15 Claims, 8 Drawing Sheets

PROVISIONING MOBILE TERMINALS WITH A TRUSTED KEY FOR GENERIC BOOTSTRAP ARCHITECTURE

BACKGROUND

Mobile terminals may use smart cards, such as Universal Integrated Circuit Cards (UICCs) to access various types of networks. The smart cards may provide services that ensure the integrity and security of personal data.

Generic bootstrapping architecture (GBA) is a standard defined by the Third Generation Partnership Project (3GPP) for authentication of a user of a mobile terminal. GBA relies on a shared secret between the mobile terminal and an application server. The mobile terminal and the application server are mutually authenticated through an intermediary server, referred to as a bootstrapping server function (BSF), that arranges a security relation between the mobile terminal and the application server.

In some situations, the smart card installed in the mobile terminal may be a trusted entity that is under the control of the network provider. The rest of the mobile terminal (i.e., the user equipment), however, may not necessarily be a trusted entity. Under GBA, the authentication of the mobile terminal and the server are based on the assumption that the user equipment is trusted. This can potentially lead to security vulnerabilities at the user equipment or in the interface between the user equipment and the smart card.

DETAILED DESCRIPTION OF PREFERRED EMBODIMENTS

The following detailed description refers to the accompanying drawings. The same reference numbers in different drawings may identify the same or similar elements.

Systems and/or methods described herein may allow mobile terminals to be authenticated separately from the smart card used by the mobile terminal. The mobile terminal, during manufacture or provisioning, may be associated with a trusted key. The trusted key may be downloaded by the smart card during over-the-air (OTA) registration of the mobile terminal. The trusted key may then be used to authenticate the mobile terminal, to the smart card, and may be used to secure communications between the smart card and the mobile terminal.

As used herein, the terms "subscriber" and/or "user" may be used interchangeably. Also, the terms "subscriber" and/or "user" are intended to be broadly interpreted to include a mobile terminal (e.g., a mobile communication device) or a user of a mobile terminal. Further, as used herein, the term "mobile terminal," "user equipment" or "UE" may be used to refer to a mobile communication device, such as a mobile phone, but not necessarily to a smart card inserted into the mobile phone. The smart card may generally refer to a device that is inserted into the mobile terminal and may, for example, ensure the integrity of personal data, contain security information associated with a network of the cellular network provider, or contain other data and/or perform other functions.

Figure 1:
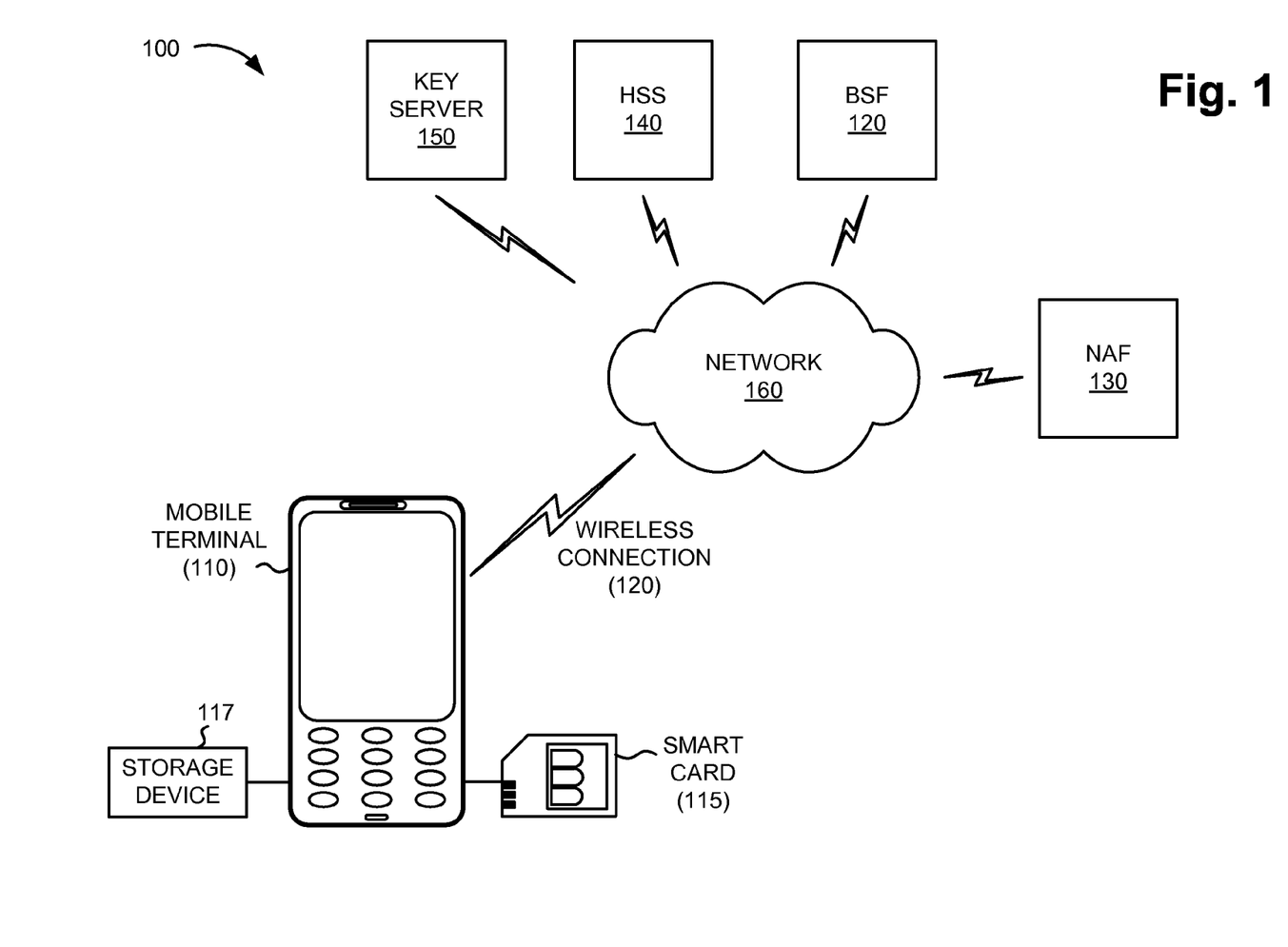
FIG. 1 is a diagram of an example environment in which systems and/or methods described herein may be implemented.

FIG. 1 is a diagram of an example environment 100 in which systems and/or methods described herein may be implemented. As illustrated, environment 100 may include a mobile terminal 110 with a smart card 115 and/or storage device 117, a bootstrapping server function (BSF) server 120, a network application function (NAF) server 130, a home subscriber server (HSS) 140, and a key server 150 interconnected by a network 160. Components of environment 100 may interconnect via wired and/or wireless connections. A single mobile terminal 110, smart card 115, BSF 120, NAF 130, HSS 140, key server 150, and network 160 have been illustrated in FIG. 1 for simplicity. In practice, there may be more mobile terminals 110, smart cards 115, BSFs 120, NAFs 130, HSSs 140, and/or networks 160.

Mobile terminal 110 may communicate (e.g., with BSF 120, NAF 130, HSS 140, and/or key server 150) via network 160. Mobile terminal 110 may include a mobile device or a stationary device using a wireless interface. For example, mobile terminal 110 may include a computation and/or communication device, such as a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a wireless device, a smart phone, a computer (e.g., personal computer, a laptop computer, or a tablet computer), a global positioning system (GPS) device, a content recording device (e.g., a camera, a video camera, etc.), a gaming device, a television set-top-box, etc. In an implementation described herein, mobile terminal 110 may include one or more application clients that may connect to NAF 130 to provide services to a user.

Smart card 115 may correspond to a universal integrated circuit card (UICC) or another type of smart card, which connects locally to mobile terminal 110, such as by insertion of smart card 115 into a slot of mobile terminal 110. Smart card 115 may include an integrated circuit and may facilitate the connection of mobile terminal 110 to network 160. Smart card 115 may include information that identifies a particular subscription to environment 100 (e.g., for a particular subscriber). Smart card 115 may include one or more Subscriber Identity Module (SIMs). A SIM may be associated with a unique identification value that identifies smart card 115 to network 160.

Storage device 117 may correspond to a non-volatile memory storage device, such as, for example, a secure digital (SD) memory card (e.g., miniSD or microSD card). In one implementation, storage device 117 may be used in situations in which a smart card 115 is not associated with mobile terminal 110. For example, for a legacy mobile terminal 110 or a mobile terminal 110 that is not designed to use a smart card 115, storage device 117 may instead be used to hold user information.

BSF 120 may include one or more server devices, or other types of computation or communication devices, that gather, process, and/or provide information in a manner described herein. For example, BSF 120 may act as an intermediary element in (connected to) network 160 that provides application independent functions for mutual authentication of mobile terminals (e.g., mobile terminal 110) and application servers (e.g., NAF 130) to each other and for "bootstrapping" the exchange of secret session keys afterwards. The bootstrap procedure may be initiated, for example, during initial power-up of mobile terminal 110 or in response to a message from a device in (or connected to) network 160 instructing mobile device 110 to begin a bootstrap operation.

NAF 130 may include one or more server devices, or other types of computation or communication devices, that gather, process, and/or provide information in a manner described herein. For example, NAF 130 may include an application server to provide applications, data, and/or services to mobile terminal 110. In one example implementation, NAF 130 may be a web server that hosts a website from which mobile terminal 110 can receive applications, data, and/or services. In another example, NAF 130 may be a content delivery server that provides broadcast video streams, Video on Demand (VoD) content, or other multimedia content. In other implementations, NAF 130 may provide location-based services.

HSS 140 may include one or more server devices, or other computation or communication devices that store information about subscribers (e.g., users of mobile terminals 110). For example, HSS 140 may store information associated with a UICC associated with a subscriber, services that the subscriber has requested or been assigned, settings associated with the services, and/or a current location of the mobile terminal of the subscriber. In one implementation, HSS 140 may provide this information to BSF 120.

Key server 150 may include one or more server devices, or other computation or communication devices that store information about mobile terminals 110. Key server 150 may, for example, store a symmetric encryption key corresponding to a key that is securely embedded in mobile terminal 110. The key may be programmed into non-volatile memory of mobile terminal 110 during manufacture of mobile terminal 110. The key may be associated with the International Mobile Equipment Identity (IMEI) value that is assigned to mobile terminal 110. The IMEI of a mobile terminal may be a unique value associated with mobile terminals. The IMEI value may be a generally accessible value, such as a value that is commonly printed inside the battery compartment of the mobile terminal. The IMEI value may be used to lookup the key, stored by key server 150, for mobile terminal 110.

Although key server 150 is illustrated in FIG. 1 as a separate network element, in some implementations, the functions of key server 150 may be performed by other components in environment 100, such as by HSS 140. Key server 150 may be used during over-the-air (OTA) activation of mobile terminal 110 and may thus be referred to as an OTA server.

Network 160 may include a local area network (LAN), a wide area network (WAN), a metropolitan area network (MAN), an intranet, the Internet, a Public Land Mobile Network (PLMN), a telephone network, such as the Public Switched Telephone Network (PSTN) or a cellular telephone network (e.g., wireless GSM, wireless UMTS, wireless CDMA, etc.), or a combination of networks. In one implementation, network 160 may include a wireless core network, an IP multimedia subsystem (IMS) network, and one or more other types of networks.

In an implementation described herein, devices in environment 100 may perform GBA authentication of mobile terminal 110. Mobile terminal 110 may send a hypertext transfer protocol (HTTP) request to BSF 120 that includes a user identity (e.g., an IP multimedia private identity (IMPI) or a temporary IP multimedia private identity (TMPI)). BSF 120 may communicate with HSS 140 to obtain GBA User Security Settings (GUSS) and a random number (RAND) that is used to calculate an authentication vector. BSF 120 may send the authentication vector and the RAND to mobile terminal 110. Mobile terminal 110 may use this information to calculate corresponding authentication values based on user secure settings stored in smart card 115 or in secure settings stored on local storage of mobile terminal 110 (e.g., storage device 117). Mobile terminal 110 may send the calculated values to BSF 120 for verification. Assuming the calculated values match, mobile terminal 110 may be considered authenticated and BSF 120 may provide a Bootstrapping Transaction Identifier (B-TID) and a key lifetime value to mobile terminal 110. Both mobile terminal 110 and BSF 120 may independently derive an actual key, referred to as a Ks_NAF, that may be used to secure communications between mobile terminal 110 and NAF 130.

Although FIG. 1 shows example devices of environment 100, in other implementations, environment 100 may include fewer devices, different devices, differently arranged devices, or additional devices/networks than depicted in FIG. 1. Alternatively, or additionally, one or more devices of environment 100 may perform one or more other tasks described as being performed by one or more other devices of environment 100.

Figure 2:
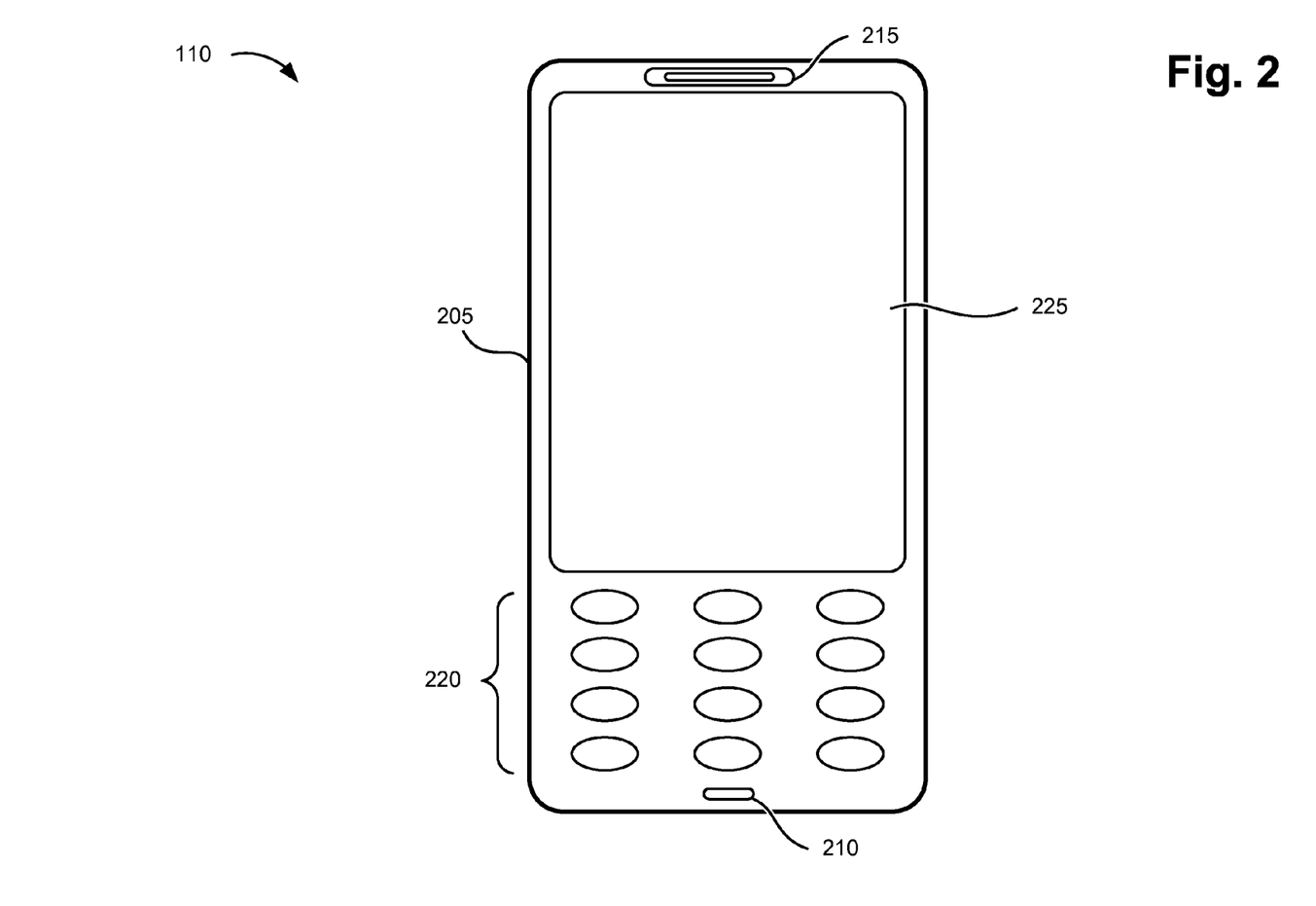
FIG. 2 is a diagram of an example mobile terminal.

FIG. 2 is a diagram of an example mobile terminal 110. As illustrated in FIG. 2, mobile terminal 110 may include a housing 205, a microphone 210, a speaker 215, a keypad 220, and a display 225.

Housing 205 may include a structure to contain components of mobile terminal 110. For example, housing 205 may be formed from plastic, metal, or some other material. Housing 205 may support microphone 210, speakers 215, keypad 220, and display 225.

Microphone 210 may include an input device that converts a sound wave to a corresponding electrical signal. For example, the user may speak into microphone 210 during a telephone call or to execute a voice command. Speaker 215 may include an output device that converts an electrical signal to a corresponding sound wave. For example, the user may listen to music, listen to a calling party, or listen to other auditory signals through speaker 215.

Keypad 220 may include an input device that provides input into mobile terminal 110. Keypad 220 may include a standard telephone keypad, a QWERTY keyboard, and/or some other type or arrangement of keys. Keypad 220 may also include one or more special purpose keys. The user may utilize keypad 220 as an input component to mobile terminal 110. For example, the user may use keypad 220 to enter information, such as alphanumeric text, to access data, or to invoke a function or an operation.

Display 225 may include an output device that outputs visual content, and/or may include an input device that receives user input (e.g., a touch screen (also known as a touch display)). Display 225 may be implemented according to a variety of display technologies, such as, a liquid crystal display (LCD), a plasma display panel (PDP), a field emission display (FED), a thin film transistor (TFT) display, or some other type of display technology. Additionally, display 225 may be implemented according to a variety of sensing technologies, such as, capacitive sensing, surface acoustic wave sensing, resistive sensing, optical sensing, pressure sensing, infrared sensing, gesture sensing, etc. Display 225 may display text, images, and/or video to the user. Display 225 may also display a user interface (e.g., a graphical user interface (GUI)) of mobile terminal 110 or a user interface of some other device which mobile terminal 110 controls, a user interface associated with applications, or the like.

Although FIG. 2 shows example components of mobile terminal 110, in other implementations, mobile terminal 110 may contain fewer components, different components, differently arranged components, or additional components than depicted in FIG. 2. Alternatively, or additionally, one or more components of mobile terminal 110 may perform one or more other tasks described as being performed by one or more other components of mobile terminal 110.

Figure 3:
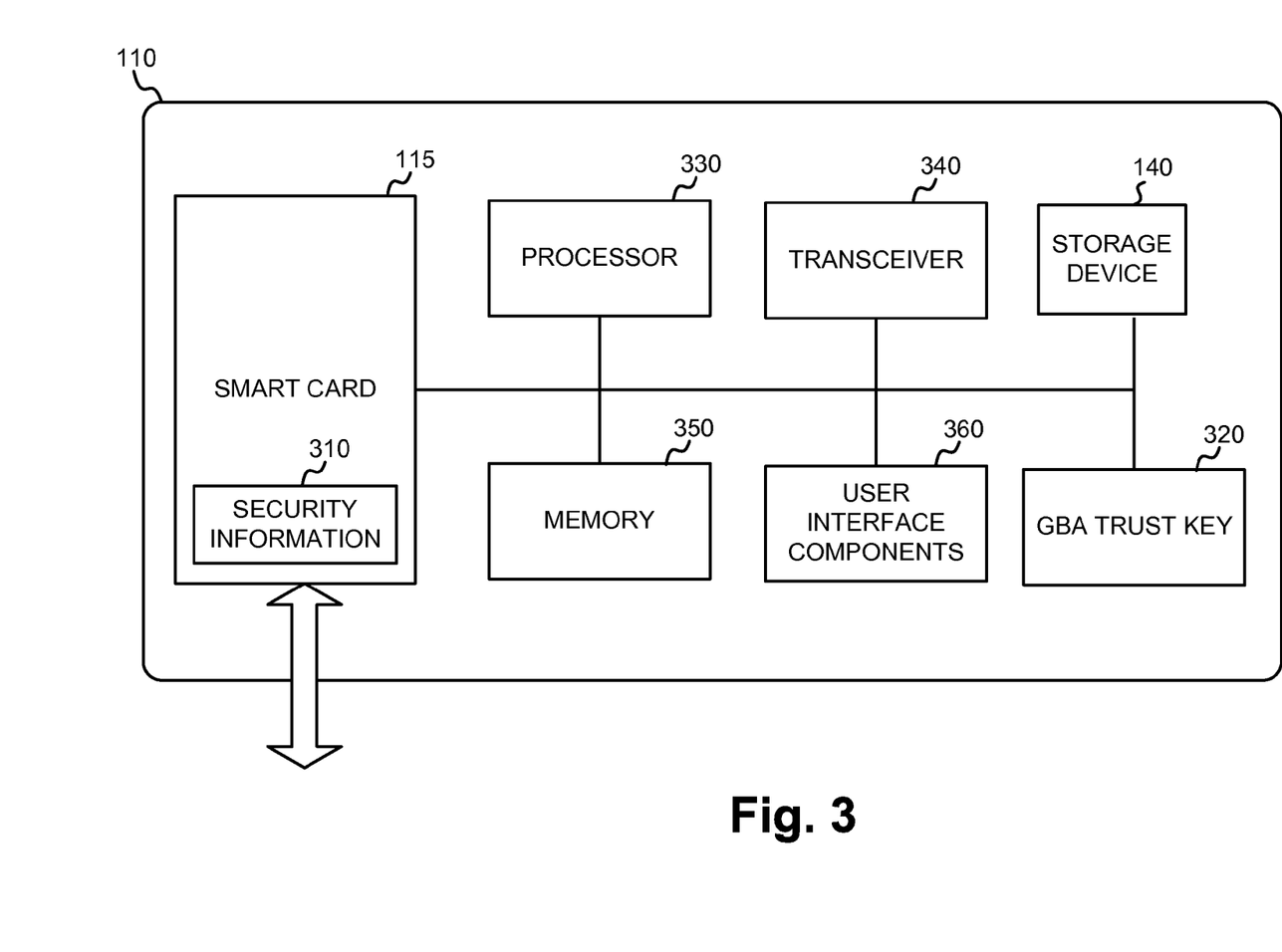
FIG. 3 is a diagram illustrating an example of components used to implement the mobile terminal shown in FIG. 2.

FIG. 3 is a diagram illustrating an example of components used to implement mobile terminal 110. Mobile terminal 110 may include smart card 115, generic bootstrapping architecture (GBA) trust key 320, a processor 330, a transceiver 340, a memory 350, and user interface components 360. Mobile terminal 110 may also, in some implementations, include storage device 117.

As previously mentioned, smart card 115 may include a removable memory and/or processing device that may be used to customize mobile terminal 110. Smart card 115 may securely store personal data that the user enters or downloads to mobile device 110. Smart card 115 may additionally store configuration information for mobile device 110, such as the phone number of the mobile device, message service parameters, hardware identifiers, analog operation parameters, network information, security information, and/or a list of available or subscribed services. Through smart card 115, a subscriber can move their account from one mobile terminal to another by switching the smart card. When used in a GSM or UMTS network, smart card 115 may be referred to as a universal integrated circuit card (UICC). Smart card 115 may be physically inserted into a mounting slot included as part of mobile terminal 110.

As shown in FIG. 3, smart card 115 may include security information 310, which may include, for example, encryption keys or other information that may be used to authenticate and/or provide for secure communications with smart card 115. Security information 310 may be included in smart card 115 during, for example, manufacture of smart card 115 or stored in smart card 115 at some other time (e.g., during initial provisioning of smart card 115). From the viewpoint of the network operator, smart card 115 may be considered to be a secure, trusted device, which may be verified through security information 310.

In situations in which mobile terminal 110 is implemented without smart card 115, storage device 117 may be used to hold security information 310. The security information in storage device 117 may function similarly to security information 310, as stored by smart card 115.

GBA trust key 320 may include security information, such as a symmetric key, that is stored in non-volatile memory of mobile terminal 110. GBA trust key 320 may include, for example, a 128-bit, device-specific, random number that is programmed into mobile terminal 110 during manufacture of mobile terminal 110. As will be described in more detail below, GBA trust key 320 may be used to authenticate mobile terminal 110 to smart card 115 and/or network 160, and to secure communications between mobile terminal 110 and smart card 115.

Processor 330 may include a processor, a microprocessor, or processing logic (e.g., an application specific integrated circuit (ASIC) or a field programmable gate array (FPGA)) that may interpret and execute instructions, such as instructions stored in a computer-readable medium (e.g., memory 350), where a computer-readable medium may be defined as a non-transitory memory device. Transceiver 340 may send and receive data wirelessly with network 160. Transceiver 340 may include, for example, an antenna, a transmitter, or a receiver.

Memory 350 may include a random access memory (RAM) or another type of dynamic or non-volatile storage device that may store data and instructions for execution by processor 330.

User interface components 360 may include components for providing output to or receiving information from a user of mobile terminal 110. User interface components 360 may include, for example, a display or touch-sensitive display, a microphone, a speaker, buttons, and/or other components used to communicate with the user. User interface components 360 may also include circuitry used to control the display, microphone, speaker, and/or the buttons.

Although FIG. 3 illustrates an example of components of mobile terminal 110, in other implementations, mobile terminal 110 may include additional, fewer, different, or differently arranged components than those illustrated in FIG. 3 and described herein. Moreover, one or more components shown in FIG. 3 may perform one or more tasks described herein as being performed by another component.

Figure 4:
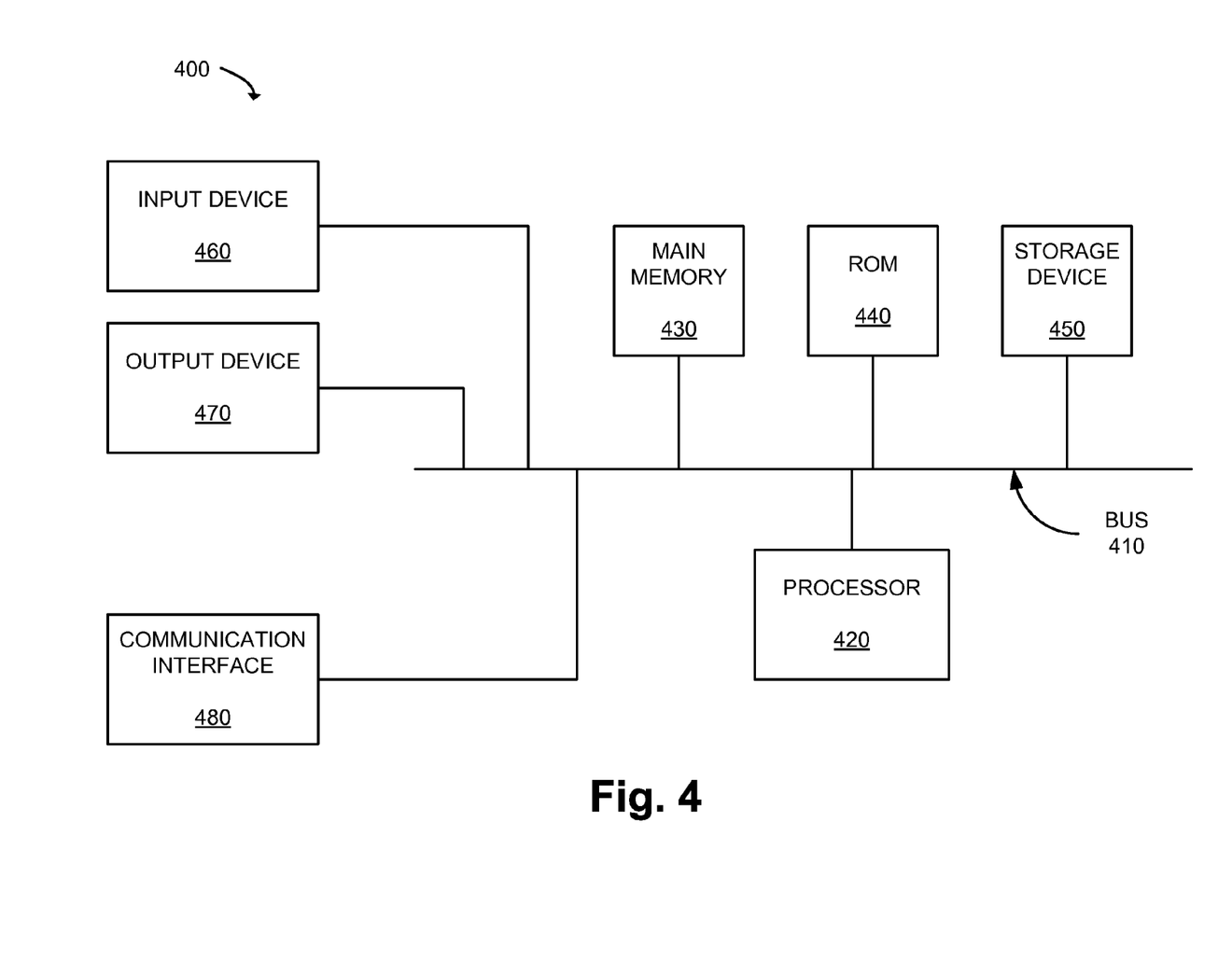
FIG. 4 is a diagram of example components of a network device shown in FIG. 1.

FIG. 4 is a diagram of example components of a device 400, which may correspond to a network device, such as BSF 120, NAF 130, HSS 140, and/or key server 150. As shown in FIG. 4, device 400 may include a bus 410, a processor 420, a main memory 430, a read only memory (ROM) 440, a storage device 450, an input device 460, an output device 470, and a communication interface 480.

Bus 410 may include a path that permits communication among the components of device 400. Processor 420 may include a processor, a microprocessor, or processing logic (e.g., an application specific integrated circuit (ASIC) or a field programmable gate array (FPGA)) that may interpret and execute instructions, such as instructions stored in a computer-readable medium (e.g., memory 430, ROM 440, storage device 450). Main memory 430 may include a random access memory (RAM) or another type of dynamic storage device that may store information and instructions for execution by processor 420. ROM 440 may include a ROM device or another type of static storage device that may store static information and instructions for use by processor 420. Storage device 450 may include a magnetic and/or optical recording medium and its corresponding drive, or a removable form of memory, such as a flash memory.

Input device 460 may include a mechanism that permits an operator to input information to device 400, such as a keyboard, a mouse, a button, a pen, a touch screen, voice recognition and/or biometric mechanisms, etc. Output device 470 may include a mechanism that outputs information to the operator, including a display, a light emitting diode (LED), a speaker, etc. Communication interface 480 may include any transceiver-like mechanism that enables device 400 to communicate with other devices and/or systems. For example, communication interface 480 may include mechanisms for communicating with another server. In some implementations, input device 460 and/or output device 470 may not be implemented by device 400. For example, device 400, when implementing BSF 120, NAF 130, HSS 140, and/or key server 150, may be a "headless" device that does not explicitly include an input or an output device.

Although FIG. 4 illustrates exemplary components of device 400, in other implementations, device 400 may include additional, fewer, different, or differently arranged components than those illustrated in FIG. 4 and described herein. Moreover, one or more components shown in FIG. 4 may perform one or more tasks described herein as being performed by another component.

Figure 5:
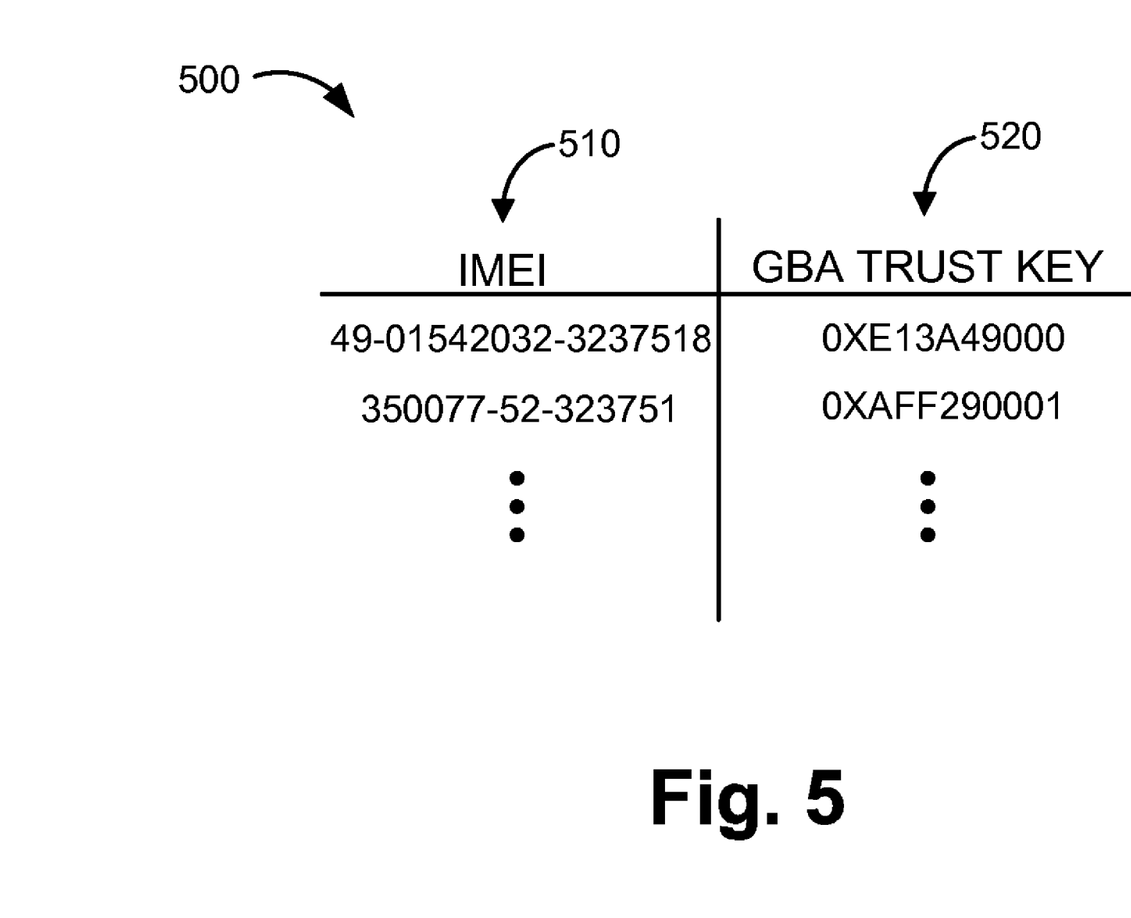
FIG. 5 is a diagram illustrating an example data structure relating to the authentication of the mobile terminal to the smart card.

FIG. 5 is a diagram illustrating an example data structure 500 relating to the authentication of mobile terminal 110 to smart card 115. Data structure 500 may be maintained by key server 150. Alternatively, the information in data structure 500 may be stored as part of the user information at HSS 140.

Data structure 500 may generally store a correspondence between the publically viewable IMEI values that are assigned to mobile terminals and the GBA trust keys (i.e., GBA trust key 320) for the mobile terminals. As previously mentioned, the GBA trust keys may be embedded within mobile terminals 110 as part of the manufacture of mobile terminals 110. The manufacturer of mobile terminals 110 may, for example, provide the corresponding IMEI values and GBA trust keys, for a group of mobile terminals, to key server 150.

As shown in FIG. 5, data structure 500 may include IMEI field 510 and GBA trust key field 520. Each entry in data structure 500 may define an IMEI/GBA trust key pair. The first example entry in data structure 500 includes, in field 510, the IMEI value "49-01542032-3237518" and, in field 520, the GBA trust key "0xE13A49000." Thus, the mobile terminal having the IMEI value "49-01542032-3237518" may store, as GBA trust key 320, the GBA trust key "0xE13A49000."

A number of example fields are shown in FIG. 5 for data structure 500. In other implementations, additional, fewer, or alternative fields may be used to implement data structure 500.

Figure 6:
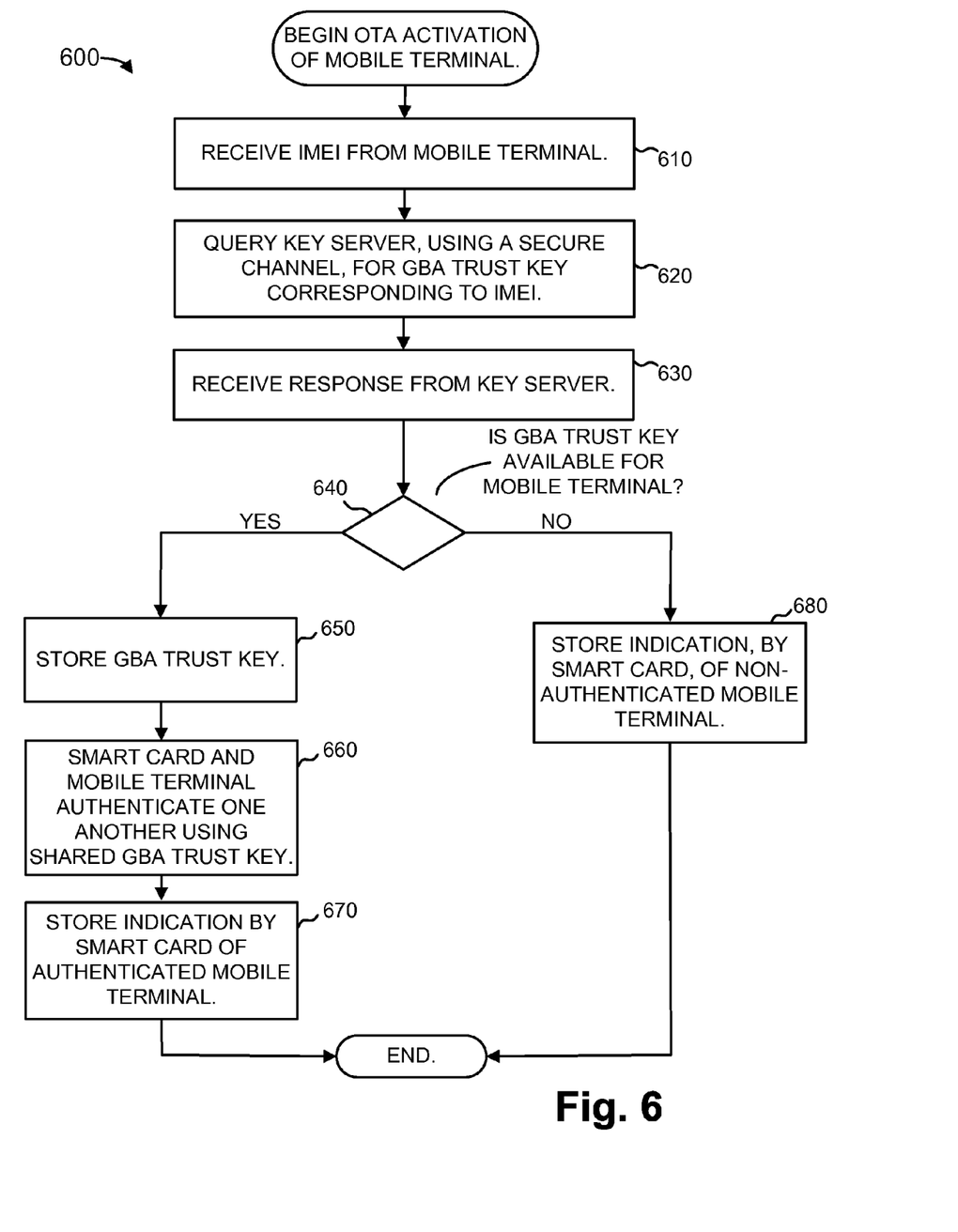
FIG. 6 is a flow chart of an example process for performing over-the-air (OTA) activation of a mobile terminal in response to insertion of a new smart card.

FIG. 6 is a flow chart of an example process 600 for performing over-the-air (OTA) activation of mobile device 110 in response to insertion of a new smart card 115. Process 600 may be performed, for example, when a user initially uses a mobile phone, which was purchased with an installed smart card, or when a user moves a smart card between phones. Process 600 may be performed by mobile terminal 110, smart card 115, and one or more network devices, such as HSS 140 and key server 150.

Process 600 may include receiving the IMEI from mobile terminal 110 (block 610). Smart card 115 may, for example, query mobile terminal 110 for the IMEI of mobile terminal 110. Because the IMEI value is a non-secret value, mobile terminal 110 may freely return the IMEI, to smart card 115, over a non-secure channel.

Smart card 115 may query, or direct mobile device 110 to query, key server 150 for the GBA trust key corresponding to the received IMEI value (block 620). For instance, smart card 115 may transmit the received IMEI value to key server 150. The communication channel with key server 150, over which the query is transmitted, may be a secure communication channel (block 620). In one implementation, the secure channel may be established using security information 310 of smart card 115. For example, security information 310 may include symmetric or asymmetric encryption keys through which smart card 115 and key server 150 may establish a secure channel. Alternatively, the channel may be generally non-secure but key server 150 may transmit an encrypted version of the GBA trust key back to smart card 115. In one implementation, the GBA trust key transmitted from key server 150 to smart card 115 may be encrypted such that mobile terminal 110 will not be able to view a plaintext version (i.e., access a non-encrypted version) of the GBA trust key as the key passes through mobile terminal 110.

Smart card 115 may receive a response from key server 150 to the query to key server 150 (block 630). The response may either include a GBA trust key, if one is available for mobile terminal 110, or an indication that key server 150 does not contain an entry for the IMEI of the query.

When the response includes the GBA trust key (meaning that the GBA trust key is available for mobile terminal 110) (block 640—YES), smart card 115 may store the GBA trust key (block 650). At this point, both smart card 115 and mobile terminal 110 may include a copy of the GBA trust key. Process 600 may include authenticating mobile terminal 110 using the GBA trust key (block 660). For example, smart card 115 may exchange information, that is encrypted using the shared GBA trust key, with mobile terminal 110. If mobile terminal 110 is able to decrypt and respond to the information from smart card 115, smart card may determine that mobile terminal 110 is authenticated. Other techniques for authenticating a device using a shared secret key may alternatively be used by smart card 115 to authenticate mobile terminal 110. When the authentication is successful, smart card 115 may store an indication that mobile terminal 110 is an authenticated mobile terminal 110 (block 670). Alternatively or additionally, smart card 115 may take other actions in response to authentication of mobile terminal 110, such as sending an indication of the authentication of mobile terminal 110 to HSS 140 or informing the user of mobile terminal 110.

Referring back to block 640, key server 150 may not return a GBA trust key for mobile device 110 (block 640—NO). Key server 150 may not return a GBA trust key for mobile terminal 110 (e.g., the response from key server 150 may not include a GBA trust key) when mobile terminal 110 is not registered with key server 150. This may be the case, for example, when mobile terminal 110 is not manufactured to include an embedded GBA trust key, such as an older mobile device that pre-dates a requirement by the network operator that GBA trust keys be used.

In response to key server 150 not returning a GBA trust key for mobile terminal 110, smart card 115 may store an indication that mobile terminal 110 is a non-authenticated mobile terminal 110 (block 670). For a non-authenticated mobile terminal 110, certain services or access privileges, relating to network 160 or to certain network applications, may be denied or restricted.

In some implementations, some legacy mobile terminals may include mobile devices that are trusted by the network provider but which do not include the GBA trust key. The IMEI of these mobile devices may also be stored by key server 150. The network operator may treat these devices as authenticated, non-authenticated, or assign these terminals some other status identifier.

Figure 7:
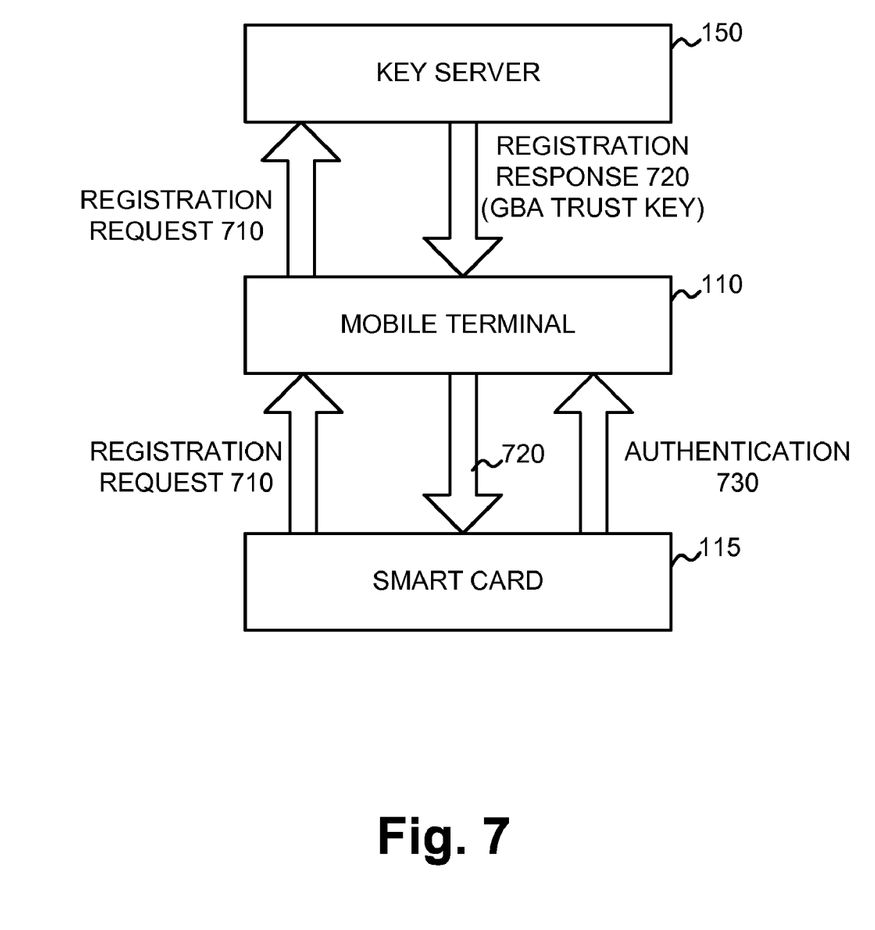
FIG. 7 is a diagram illustrating an example of communication flow when performing OTA activation of a mobile terminal.

FIG. 7 is a diagram illustrating an example of communication flow when performing OTA activation of mobile terminal 110, such as the OTA activation described with regard to FIG. 6. In FIG. 7, communications between smart card 115, mobile terminal 110, and key server 150 are illustrated. The communication between smart card 115 and mobile terminal 110 may be over a local interface, such as a physical interface that connects smart card 115 and mobile terminal 110. In one implementation, the interface between mobile terminal 110 and key server 150 may include a remote wireless (e.g., OTA) interface. As mentioned previously, local storage other than smart card 115, such as storage device 117, may alternatively be used in place of smart card 115.

Assume that smart card 115 detects that it is inserted into a new mobile terminal 110. Smart card 115 may initiate registration via registration request 710 to mobile terminal 110. Mobile terminal 110 may contact key server 150 and forward registration request 710, which may include the IMEI value of mobile terminal 110 (see also, blocks 610 and 620). In some implementations, the registration request, from smart card 115, may not include the IMEI value, and mobile terminal 110 may "complete" the request by adding the IMEI value to the request.

Key server 150 may respond to registration request 710 by returning, if available, the GBA trust key of mobile terminal 110, as registration response 720 (see also, blocks 630, 640, and 650). Registration response 720, or parts of registration response 720, such as the GBA trust key, may be encrypted so that mobile terminal 110 is not able to intercept/access the GBA trust key. Mobile terminal 110 may forward registration response 720 to smart card 115.

Smart card 115 may then initiate authentication of mobile terminal 110, shown as authentication 730 (see also, block 660). The authentication of mobile terminal 110 (authentication 730) may be based on the shared GBA trust key that is stored by mobile terminal 110 and smart card 115. For example, smart card 115 may send an authentication request to mobile terminal 110, in which the authentication request includes a field encrypted with the GBA trust key. If mobile terminal 110 is able to successfully de-crypt the field and return a corresponding encrypted field, smart card 115 determine mobile terminal 110 to be authenticated.

Figure 8:
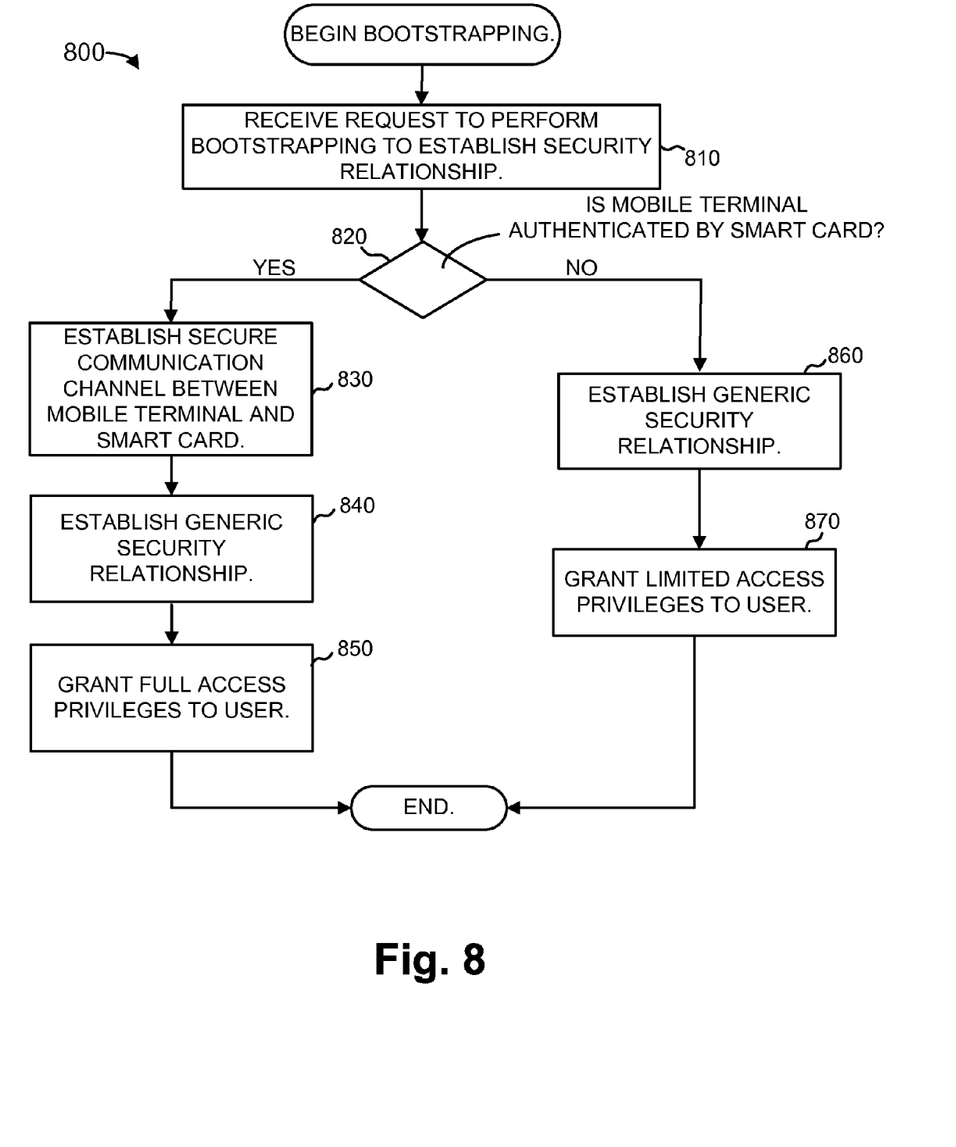
FIG. 8 is a flow chart of an example process for performing bootstrapping between a mobile terminal and a network application or service.

FIG. 8 is a flow chart of an example process 800 for performing bootstrapping between mobile terminal 110 and a network application or service (e.g., NAF 130). Process 800 may be performed by, for example, mobile terminal 110, smart card 115, NAF 130, and/or BSF 120. Process 800 may be performed whenever mobile terminal 110 or the user of mobile terminal 110 would like to obtain access to a network service or function that requires a security relationship and for which no security relationship initially exists.

BSF 120 may receive a request, such as a request from mobile terminal 110 or NAF 130, to perform a bootstrapping procedure (block 810). For example, NAF 130 may receive a request for a service from mobile terminal 110. NAF 130 may determine that the requested service requires a secure channel and that information to create a secure channel with mobile terminal 110 is not currently available. NAF 130 may contact BSF 120 to initiate getting the security information.

Mobile terminal 110 and/or smart card 115 may determine whether mobile terminal 110 has been authenticated by smart card 115 (e.g., as previously discussed with respect to FIGS. 6 and 7). When mobile terminal 110 is authenticated, (block 820—YES), a secure communication channel may be established between mobile terminal 110 and smart card 115 (block 830), such as a secure communication channel that is established based on the shared GBA trust key. The secure communication channel may be established using, for example, the transport layer security pre-shared key ciphersuites (TLS-PSK) protocol or another protocol.

Process 800 may include establishing a generic security relationship using BSF 120 (block 840). The generic security relationship may be established between NAF 130 and mobile terminal 110/smart card 115. BSF 120 may establish the generic security relationship between mobile terminal 110 and smart card 115 using known GBA or generic authentication architecture (GAA) techniques. In general, these techniques may include mobile terminal 110 and BSF 120 mutually authenticating via the authentication and key agreement (AKA) protocol, BSF 120 sending queries to HSS 140, and mobile terminal 110 and BSF 120 agreeing on a session key to be used for encrypted data exchange with NAF 130. In this manner, a secure channel may be established between NAF 130 and mobile terminal 110. Throughout the process of block 840, the secure channel between mobile terminal 110 and smart card 115, as established in block 830, may be used for communications over the interface between mobile terminal 110 and smart card 115. Advantageously, after the generic security relationship is established, the entire link from NAF 130 to smart card 115 may be a secure connection.

Smart card 115, when it is able to authenticate mobile terminal 110, may grant mobile terminal 110 full or "normal" access privileges to network services or functions (e.g., functions performed by NAF 130) (block 850).

Referring back to block 820, if mobile terminal 110 is not authenticated by smart card 115 (block 820—NO), a generic security relationship may still be established between NAF 130 and mobile terminal 110 (block 860). The generic security relationship may be established using standard GBA or GAA techniques. In this situation, however, because a secure channel between mobile terminal 110 and smart card 115 is not available (and because mobile terminal 110 was not authenticated), limited access privileges may be granted to the user of mobile terminal 110 (block 870). For example, certain applications, certain data, or certain network services may be denied access to the mobile terminal. Alternatively or additionally, smart card 115 may deny access to certain data or applications stored by smart card 115. The network operator or other entity (e.g., a corporate user's IT department) may determine which applications/services require full access privileges.

As described above, encryption information may be stored in a mobile terminal, such as an encryption key stored during manufacture of the mobile terminal. The encryption information may be securely transmitted, during an activation process, to a smart card of the mobile terminal and used by the smart card to authenticate the mobile terminal and/or to establish a secure communication channel with the mobile terminal.

The foregoing description provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 6 and 8, the order of the blocks may be changed in other implementations. Also, non-dependent blocks may be performed in parallel.

Also, certain functions have been described as being performed by smart card 115 and certain other functions have been described as being performed by mobile terminal 110. In other implementations, one or more of the functions, described as being performed by smart card 115, may be performed by mobile terminal 110; and/or one or more of the functions, described as being performed by mobile terminal 110, may be performed by smart card 115.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A system comprising:
   a mobile terminal including:
      a non-volatile memory to store security information;
      a slot to receive a card; and
      a transceiver to wirelessly transmit and receive data; and
   a smart card, received in the slot, wherein the smart card is configured to:
      query the mobile terminal for a non-secretive value identifying the mobile terminal;
      receive, responsive to the query, the non-secretive value;
      transmit, via the mobile terminal, a query indicative of the non-secretive value, to a server, for a trust key corresponding to the security information stored by the non-volatile memory of the mobile terminal;
      receive, from the server via the mobile terminal, the trust key in an encrypted format that the mobile terminal is not configured to intercept or access;
      exchange, with the mobile terminal, information encrypted using the trust key;
      authenticate the mobile terminal, based on a response to the exchanged information indicative of the mobile terminal decrypting the exchanged information;
      grant varying access privileges, to network services or data, when the authentication is successful;
      form a secure communication channel between the smart card and the mobile terminal using the security information and the trust key; and
      establish, with the mobile terminal, a generic security relationship with a network application function to link the smart card to the network application function at least partially over the secure communication channel.

2. The system of claim 1, where the security information is stored in the mobile terminal during manufacture of the mobile terminal.

3. The system of claim 1, where the security information includes a symmetric encryption key corresponding to the trust key.

4. The system of claim 1, wherein the non-secretive value includes an International Mobile Equipment Identity (IMEI) value corresponding to the mobile terminal and where the server retrieves the trust key based on the IMEI value.

5. The system of claim 1, wherein the query to the server is performed as part of activation of the mobile terminal and the smart card, and is transmitted in response to insertion of the smart card into the slot or in response to powering up of the mobile terminal.

6. The system of claim 1, wherein the secure communication channel is formed based on a transport layer security pre-shared key ciphersuites (TLS-PSK) protocol.

7. The system of claim 1, where the server stores correspondences between a plurality of mobile terminals and security information for each of the plurality of mobile terminals.

8. A device-implemented method comprising:
   querying, by a smart card, a mobile terminal for a non-secretive value identifying the mobile terminal,
   receiving, at the smart card in response to the query, the non-secretive value,
   querying, by the smart card, a remote server, based on the non-secretive value, for security information relating to the mobile terminal, wherein a copy of the security information is stored in the mobile terminal as part of the manufacture of the mobile terminal;
   receiving, by the smart card and from the remote server via the mobile terminal in response to the query, the security information in an encrypted format that the mobile terminal is not configured to view in plaintext;
   communicating, by the smart card, with the mobile terminal, to authenticate the mobile terminal, by the smart card, based on the security information received in response to the query and the copy of the security information that is stored in the mobile terminal;
   granting, to a user of the mobile terminal, varying access privileges to data or network services based on a result of the authentication of the mobile terminal,
   forming a secure communication channel between the smart card and the mobile terminal based on the security information received in response to the query and the copy of the security information, and
   establishing, at least partially over the secure communication channel, a generic security relationship between the mobile terminal and a network application function.

9. The method of claim 8, wherein the non-secretive value includes an International Mobile Equipment Identity (IMEI) value, wherein the server identifies the security information based on the IMEI value.

10. The method of claim 8, where the security information includes a symmetric encryption key.

11. The method of claim 8, wherein the secure communication channel is formed based on a transport layer security pre-shared key ciphersuites (TLS-PSK) protocol.

12. A non-transitory computer-readable medium including instructions, that when executed by one or more processors, cause the one or more processors to:
   query, by a smart card, a mobile terminal for a non-secretive value identifying the mobile terminal,
   receive, at the smart card in response to the query, the non-secretive value,
   query a remote server, based on received value identifying the mobile terminal, for security information that is stored in the mobile terminal as part of the manufacture of the mobile terminal;
   receive the security information in response to the query, the security information being received in an encrypted format that the mobile terminal is not configured to intercept or access;
   authenticate, by a smart card inserted in the mobile terminal, the mobile terminal, based on the security information received in response to the query and the security information that is stored in the mobile terminal as part of the manufacture of the mobile terminal;
   grant, to a user of the mobile terminal, varying access privileges to data or network services based on a result of the authentication of the mobile terminal;
   form a secure communication channel between the smart card and the mobile terminal based on the security information received in response to the query and the security information that is stored in the mobile terminal; and
   establish, at least partially over the secure communication channel, a generic security relationship between the mobile terminal and a network application function.

13. The computer-readable medium of claim 12, where the value includes an International Mobile Equipment Identity (IMEI) value.

14. The computer-readable medium of claim 12, where the security information includes a symmetric encryption key.

15. A device comprising:
a non-volatile memory to store a first encryption key that is programmed into the non-volatile memory during manufacture of the device;
a slot to receive a smart card; and
a transceiver configured to wirelessly transmit and receive data, the transceiver to receive, on behalf of the smart card and from a remote server, a second encryption key that is not readable when passing through the device to the smart card, via a local interface, and wherein the smart card is configured to:

establish a secure communication channel with the device, via the local interface, when the device is authenticated using the first encryption key to decrypt exchanged information encrypted by the smart card using the second encryption key, and establish, at least partially over the secure communication channel, a generic security relationship between the mobile terminal and a network application function.

* * * * *